United States Patent [19]

Schaus

[11] 4,118,451
[45] Oct. 3, 1978

[54] METHOD OF CONTROLLING FOAMING OF CABINET INSULATION

[75] Inventor: John Joseph Schaus, Evansville, Ind.

[73] Assignee: Whirlpool Corporation, Benton Harbor, Mich.

[21] Appl. No.: 793,074

[22] Filed: May 2, 1977

[51] Int. Cl.² .............................................. B29D 27/04
[52] U.S. Cl. .................................. 264/46.5; 264/46.6; 264/261; 312/214
[58] Field of Search ....................... 264/46.5, 46.6, 54, 264/261; 312/214

[56] References Cited

U.S. PATENT DOCUMENTS

| 3,078,003 | 2/1963 | Kesling | 220/9 |
| 3,132,382 | 5/1964 | Magester | 264/54 X |
| 3,152,199 | 10/1964 | Roberts | 264/46.5 |
| 3,278,065 | 10/1966 | Cyrus | 220/9 |
| 3,440,308 | 4/1969 | Carbary | 264/46.5 X |

FOREIGN PATENT DOCUMENTS

| 566,282 | 8/1957 | Italy | 264/46.7 |
| 42-7,187 | 3/1967 | Japan | 264/46.5 |

Primary Examiner—Philip Anderson
Attorney, Agent, or Firm—Wegner, Stellman, McCord, Wiles & Wood

[57] ABSTRACT

A method of controlling the foaming of foamed-in-place insulation in a cabinet structure having an inner liner and an outer shell with the liner having an outer surface and the shell having an inner surface in outwardly spaced confronting relationship to the outer surface of the liner at a front opening of the cabinet. A flexible sheet is secured to either the outer surface of the liner or the inner surface of the shell at the front opening and has a preselected stiffness so as to cause the sheet to project away from the surface to which it is secured whereby the foaming of the insulation may carry the projected portion to the front opening of the insulation space. A backup member may be disposed across the opening so as to limit the outward deflection of the strip by the foam whereby the strip defines the outer boundary of the foamed insulation across the opening. A portion of the opening may be defined by an inturned flange and the sealing strip may further be urged against the flange by the foaming insulation. The strip may be transparent to permit observation of the insulation formation at the opening.

15 Claims, 8 Drawing Figures

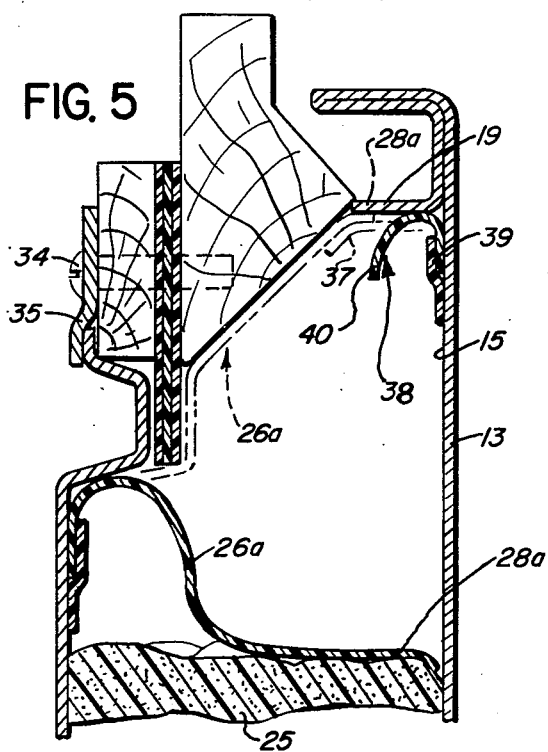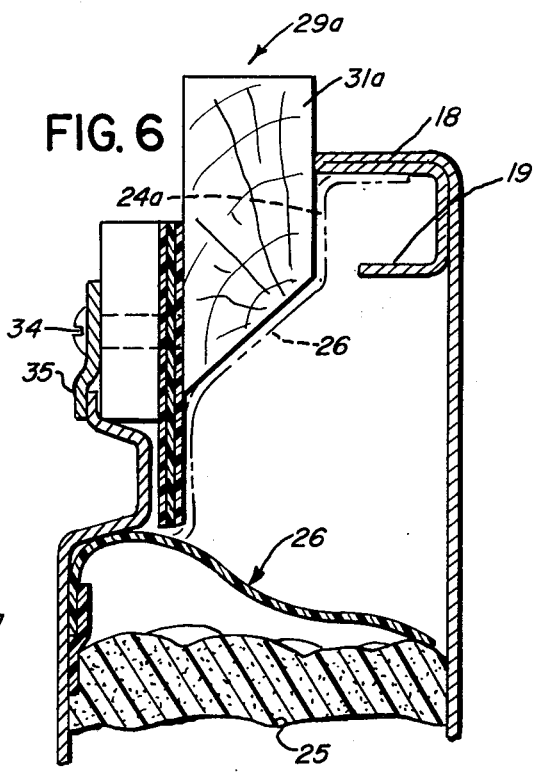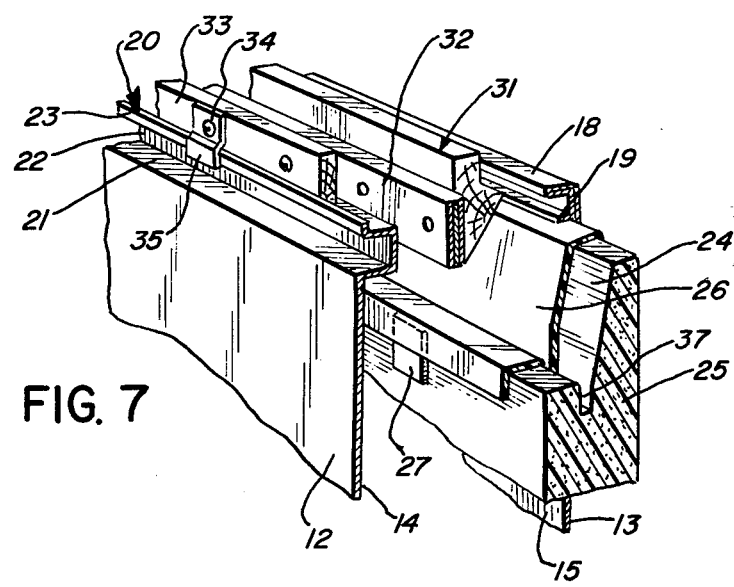

METHOD OF CONTROLLING FOAMING OF CABINET INSULATION

BACKGROUND OF THE INVENTION

1. Field of the Invention

This invention relates to the forming of insulated cabinets and in particular to forming of foamed-in-place insulation in such cabinets.

2. Description of the Prior Art

In U.S. Pat. No. 3,440,308, of Richard J. Carbary et al, a foamed refrigeration cabinet includes a valve member secured to a casing at an opening which is provided for permitting introduction of a tubular element therethrough for introducing foamable insulating material through the opening. Upon removal of the tubular element, the internal pressure of the foaming resin causes the valve to shut off the opening. A thin polyethylene member is used to seal the breaker area against foam leakage.

In Frank E. Randall U.S. Pat. No. 3,478,135, sponge members are disposed along the walls of the cavity defined by an edging strip. The final expansion of the foam presses and collapses the sponge members.

In U.S. Pat. No. 3,752,350, Howard S. Franck provides a sealing strip of circular cross section formed of a pliant and resilient material, or sealing mastic. The strip is caused to flow into sealing engagement with adjacent portions of the liner and shell by the pressure of the foaming insulation.

Keith K. Kesling, in U.S. Pat. No. 3,078,003, shows a refrigerator cabinet construction wherein a flexible bag or sheet of polyethylene is utilized as a portion of the surface against which the foaming insulation expands.

Edward H. Roberts, in U.S. Pat. No. 3,152,199, shows a method of manufacturing insulated refrigerator cabinets wherein a removable backup member which extends across a portion of the breaker area is used to support a corrugated wall portion.

Alva E. Cyrus, in U.S. Pat. No. 3,278,065, shows a cabinet structure wherein a flexible sheet of polyethylene, or similar material, extends across the width of the bottom wall and upwardly along the sidewalls of the cabinet to provide a seal.

In U.S. Pat. No. 3,512,323, which patent is owned by the assignee hereof, Ronald K. Hupfer discloses an insulated wall structure wherein a foaming control means is provided comprising a strip of fibrous material having an impervious backing layer. This strip is installed within the wall structure to extend across the front opening with the fibrous material confronting the foaming space to denucleate the expanding urethane foam and thereby form a coating of gas-free material on the fibers.

In U.S. Pat. No. 3,883,198, which patent is owned by the assignee hereof, Harry L. Tillman shows a cabinet construction utilizing a thin flexible tape for sealing the joint between the liner and cabinet flanges which are overlapped, thereby eliminating the need for a breaker strip. The tape may be formed of paper or synthetic plastic, such as polyethylene, and one portion thereof may be provided with an adhesive for holding the tape to an inner surface of one of the legs of the flanges at the outer opening. The distal end of the tape wipes against the inner surfaces of the liner as the liner is installed so as to close the end of the space against flow of foaming plastic to between the slip-fitted wall portions effectively closing the opening.

SUMMARY OF THE INVENTION

The present invention comprehends an improved method of controlling foaming of foamed-in-place insulation in a cabinet structure wherein the liner and outer shell define an insulation space therebetween having an outer opening. A deflectible sheet is secured to one of the outer surface of the liner or inner surface of the shell adjacent the opening. The sheet is flexible but has a stiffness preselected to cause the sheet to project away from the surface to which it is secured. The liner is then inserted into the shell to define the insulation space therebetween.

Insulation is then foamed in place in the insulation space with the foaming insulation moving toward the insulation space opening to deflect the sheet toward the opening and cause the projecting portion thereof to engage and conform to the other surface. Upon completion of foaming, the sheet extends between the liner and shell to define an outer boundary of the formed insulation across the opening.

A removable backup means is disposed across the opening between the cabinet and liner to limit the deflection of the sheet. If desired, a breaker strip may be employed for this purpose. Alternatively, the backup means may comprise a plurality of separate backup members.

A second deflectible sheet may be secured to the other surface adjacent said opening to be deflected upwardly also by the foaming insulation and to define a portion of the upper boundary of the foamed insulation across the opening.

The backup means is arranged so as to permit air to escape outward thereby. Thus, during the foaming operation air can vent outward through the opening until such time as the expanding foam has carried the film to its final sealing position behind the backup means.

The sheet may be secured to the outer surface of the liner and the shell may include an inturned flange adjacent the opening whereby the distal portion of the sheet engages the flange as a result of the foaming of the insulation.

Thus, the method of controlling foaming of a foamed-in-place insulation in a cabinet structure of the present invention is extremely simple and economical while yet providing an improved forming of a desired boundary to the foaming insulation at the front opening of the insulation space.

BRIEF DESCRIPTION OF THE DRAWING

Other features and advantages of the invention will be apparent from the following description taken in connection with the accompanying drawings, wherein:

FIG. 5 is a fragmentary vertical section illustrating a modified form of boundary means used in a modified method embodying the invention;

FIG. 6 is a fragmentary vertical section illustrating another modified form of boundary means utilized in another method embodying the invention; and FIG. 7 is a fragmentary perspective view with portions broken away illustrating the construction of FIG. 4.

DESCRIPTION OF THE PREFERRED EMBODIMENT

Figure 1:
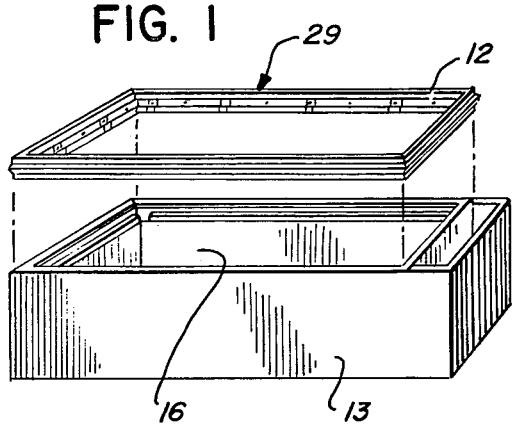
FIG. 1 is a perspective view illustrating one step in a cabinet-forming method embodying the invention.

In the exemplary embodiment of the invention as disclosed in the drawings, an improved cabinet construction generally designated 10 comprises a foamed-in-place insulated cabinet, such as a refrigerator or freezer cabinet. The present invention is concerned with an improved method of forming such a cabinet and more specifically, with an improved method of controlling the foaming of the insulation at a boundary across a front opening of an insulation space 11 defined by an inner liner 12 and an outer shell 13. Liner 12 defines an outer surface 14 and shell 13 defines an inner surface 15 which are disposed in spaced confronting relationship to define therebetween the insulation space 11.

Figure 2:
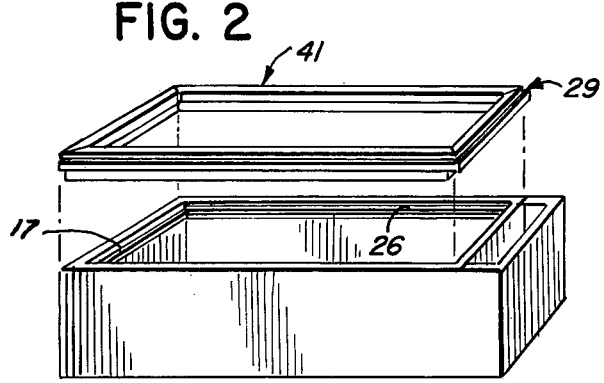
FIG. 2 is a perspective view illustrating a subsequent step therein.

As shown in FIG. 1, each of the shell 13 and liner 12 comprises a generally parallelepiped member with the liner being adapted to nest within a refrigerator compartment portion 16 of the shell. In the illustrated embodiment, during assembly the shell is disposed horizontally to open upwardly with the liner being brought downwardly into the shell to have spaced relationship therewith, as shown in FIG. 2, and to define a front opening 17 at the upper end of the insulation space 11 in the nested arrangement of the liner and shell.

Figure 3:
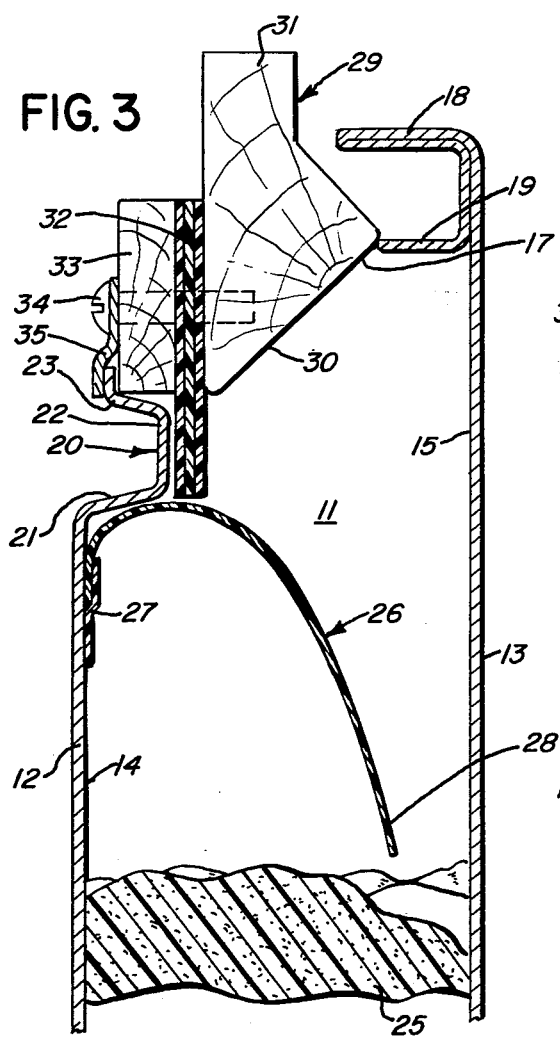
FIG. 3 is a fragmentary enlarged vertical section illustrating a further subsequent step.

As more specifically illustrated in FIG. 3, the shell may include, at its upper or distal end, an inturned front flange 18 and inwardly thereof a secondary flange 19. The liner may be provided at its upper distal end with an outturned flange portion generally designated 20, including an outturned inner portion 21, an upstanding midportion 22, and a returned outer portion 23. As shown in FIG. 3, the flange 20 may be spaced inwardly, or downwardly, of the flange 19.

To provide a desired foam insulation in the insulation space 11, foaming material is conventionally placed in the lower portion of the nested assembly insulation space and allowed to expand upwardly to the upper opening 17. In such insulated cabinet constructions, it is conventional to provide a breaker strip across the opening 17 to finish the cbinet construction at the front opening thereof. It is therefore desirable to accurately limit the upward foaming of the insulation to define a desired boundary thereof across the opening 17. It is also desirable to provide a vapor barrier across the opening 17.

Figure 4:
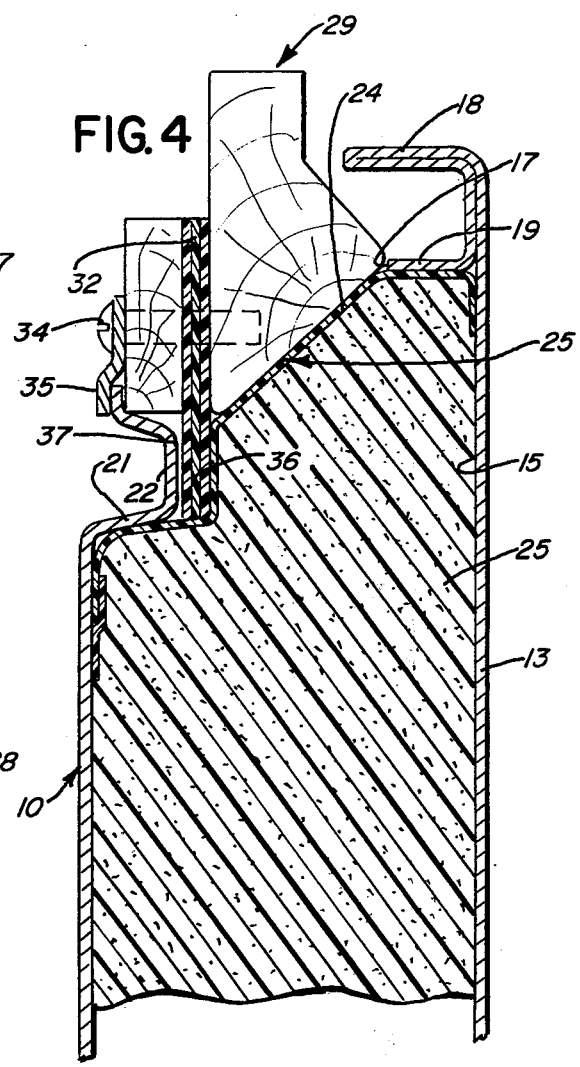
FIG. 4 is a fragmentary enlarged vertical section illustrating a final step in the forming of the insulation in the cabinet construction.

The present invention provides an improved control of the foaming at the opening 17 so as to provide a desired, accurately defined vapor barrier and boundary 24 of the foamed insulation 25, as shown in FIG. 4. The boundary thus created is provided by an improved, simplified structure and method.

More specifically as shown in FIGS. 1 and 3, prior to the insertion of the liner into the upwardly opening shell, a strip of sheet film 26 is secured to the liner, as by adhesive tape 27, to project outwardly therefrom in a somewhat downwardly hanging configuration. Upon completion of the installation of the liner in the shell, the distal portion 28 of the strip 26 may be disposed adjacent the inner surface 15 of shell 13 in a free hanging arrangement, as shown in FIG. 3.

In the illustrated embodiment, the strip 26 comprises a strip of polyethylene film having a thickness of from 2 to 8 mils. The strip material preferably has a flexibility which permits it to conform to the desired boundary shape, while yet having a stiffness which permits it to hang downwardly in the configuration illustrated in FIG. 3 with the distal portion projecting outwardly as shown therein. Alternatively, the strip 26 may comprise a film of porous spun or woven plastic material which is impervious to foam while permitting the passage of air therethrough.

The invention further comprehends the provision of a backup structure generally designated 29 which, as shown in FIG. 2, is inserted into the shell to define a lower surface 30 (FIG. 3) defining a preselected boundary arrangement across opening 17.

In the embodiment of FIGS. 1-7, the backup means comprises a frame adapted to be set in place as a unit, it being obvious to those skilled in the art that the backup means may comprise any suitable arrangement of separate portions as desired.

As further shown in FIG. 3, the backup means includes a rigid block portion 31, a flexible insert portion 32, and an outer rigid clamping portion 33 for securing the flexible portion 32 to the block portion 31 as by means of a plurality of screws 34. Screws 34 also secure a plurality of clip means 35 to block portion 31, the clip means serving to assist in the proper positioning of the backup structure 29 as it is placed in the opening 17.

With the backup means 29 set in place, as illustrated in FIGS. 3 and 4, the rising foam insulation carries upwardly with it the projecting portion of the strip 26 so as to firmly urge against it the liner flange portion 21, about the lower end 36 of the flexible backup member portion 32, against the lower surface 30 of block portion 31, and against the lower surface of secondary flange 19 and inner surface 15 of the shell 13. Thus, the strip 26 effectively defines the desired upper boundary 24 of the insulation 25 and effectively seals the opening 17 against extrusion of insulation material outwardly therefrom by the foaming pressure developed in the foaming operation. The strip 26 also constitutes an effective vapor barrier which inhibits the entry of moisture into the insulation space 11.

Upon completion of the foaming operation, the backup means 29 may be removed upwardly from the shell leaving the upper boundary of the insulation in the configuration defined by the strip 26, as shown in FIG. 4. Thus, a pocket 37 is provided outwardly of the flange portion 22 for receiving a lower portion of the breaker strip means (not shown).

Referring now to FIG. 5, a modified method of forming the cabinet construction is shown to utilize a narrow, second sealing strip 38 which may be secured to the inner surface 15 of the shell 13 by suitable means, such as adhesive tape 39, so as to cause the distal portion 40 of the strip 38 to project inwardly away from the shell surface 15 under the secondary flange 19.

Thus, as shown in broken lines in FIG. 5, the primary strip 26a is somewhat narrower than strip 26 of the first described embodiment, and is urged upwardly by the foaming insulation to have overlapped relationship with the secondary strip 38. Ilustratively, the secondary strip 38 distal portion 40 may overlap the distal portion 28a of the primary strip 26a in the boundary forming arrangement thereof shown in broken lines.

In all other respects, the method of forming the cabinet construction of FIG. 5 is similar to that of FIGS. 3 and 4.

Referring now more specifically to the embodiment of FIG. 6, the backup means 29a illustrated therein utilizes a block portion 31a which is adapted to clear the front flange 18 but remain spaced inwardly of the secondary flange 19. Thus, the strip 26 may be deflected upwardly past the secondary flange 19 into engagement with the outer front flange 18, as shown in broken lines, so as to provide insulation in the space between the flanges 18 and 19, where desired. Thus, the boundary 24a of the embodiment of FIG. 6 differs somewhat from the boundary 24 of the embodiment of FIGS. 3 and 4, while yet utilizing the inventive concept of the deflectible strips being urged by the expanding foam insulation to the boundary defining arrangement under the control of the backup means.

In all other respects, the method of forming the cabinet construction illustrated in FIG. 6 is similar to the method of FIGS. 3 and 4.

Figure 8:
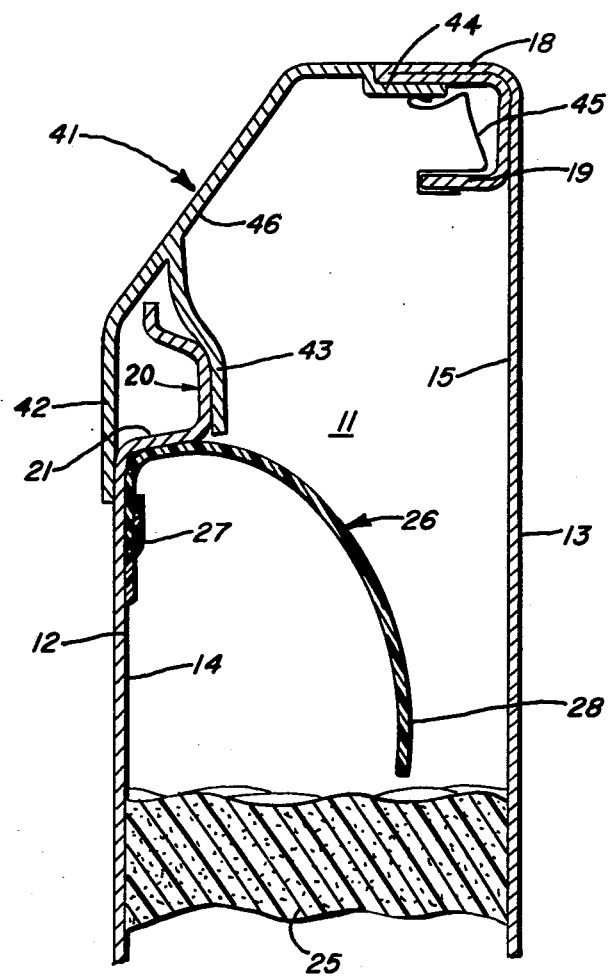
FIG. 8 is a fragmentary vertical section illustrating the use of a breaker strip as the removable backup member.

Referring now to FIG. 8, a conventional breaker strip shown generally at 41 may be employed as the backup member during the foaming operation. In the embodiment illustrated, breaker strip 41 includes an outer leg portion 42 and an inner leg 43 which surround and grip the liner flange 20. A lip portion 44 and a cooperating spring clip 45 secure the breaker within the front flange 18 of the cabinet shell 13.

The method of foaming the cabinet using a breaker strip as the backup member is essentially as described previously. The sheet film 26 is taped in place prior to assembling the liner 12 and shell 13 in nested relationship. The breaker strip 41 is then installed and the expandable foaming material introduced into the insulation space. As the foam expands, the sheet film 26 will be carried upward into engagement with the rear surface 46 of breaker strip 41, thus defining the desired foam seal and vapor barrier. As can be appreciated with reference to FIG. 8, the foam boundary thus defined extends forward to essentially the front flange 18, similar to the boundary defined in the embodiment of FIG. 6.

Thus, the method of forming a foamed-in-place insulated cabinet embodying the present invention is extremely simple and economical of construction while yet providing an accurate, preselected boundary to the foamed insulation across the front opening of the insulation space, permitting facilitated installation of the breaker strip means in completing the assembly of the cabinet construction.

The foregoing disclosure of specific embodiments is illustrative of the broad inventive concepts comprehended by the invention.

Having described the invention, the embodiments of the invention in which an exclusive property or privilege is claimed are defined as follows:

1. The method of controlling the forming of a foamed-in-place insulation in a cabinet structure having an inner liner and an outer shell, said liner having an outer surface and said shell having an inner surface in outwardly spaced confronting relationship to said outer surface to define an insulating space therebetween having a front opening, said method comprising the steps of:

securing a first portion of a deflectible sheet to one of said surfaces adjacent said opening with the remainder of the sheet being free for movement, said sheet having a stiffness preselected to cause said remainder of the sheet to project away from said one surface;

inserting said liner into said shell to define said insulation space therebetween; and introducing expandable foam insulating material into said insulation space to foam therein so as to substantially fill said insulation space and concurrently deflect said remainder of the sheet toward said front opening and into engagement with the other of said surfaces, said sheet extending between said liner and shell surfaces to define an outer boundary of the foamed insulation fully across said opening.

2. The insulation forming method of claim 1 further including the step of positioning a removable backup means across said opening prior to the deflection of said sheet by said foam to limit said deflection of the sheet.

3. The insulation forming method of claim 1 wherein said sheet is formed of a synthetic resin.

4. The insulation forming method of claim 1 wherein said sheet is formed of polyethylene.

5. The insulation forming method of claim 1 wherein said sheet is formed of a porous synthetic resin effectively impervious to said foam material while yet permitting passage of air therethrough.

6. The insulation forming method of claim 1 wherein said sheet is secured to said one surface by adhesive tape means.

7. The insulation forming method of claim 1 wherein a plurality of backup members are disposed across said opening prior to the deflection of said sheet by said foam to limit said deflection of the sheet.

8. The insulation forming method of claim 1 wherein said sheet is secured to said liner outer surface about substantially the entire periphery of said liner and said shell defines an inturned flange adjacent said opening, said projecting portion of the sheet engaging said flange as a result of said foaming.

9. The cabinet assembly method of claim 1 wherein said strip of sealing material is taped to said cabinet liner.

10. The insulation forming method of claim 1 further including the step of positioning a breaker strip across said opening prior to the deflection of said sheet by said foam to limit said deflection of the sheet.

11. The method of controlling the forming of a foamed-in-place insulation in a cabinet structure having an inner liner and an outer shell, said liner having an outer surface and said shell having an inner surface in outwardly spaced confronting relationship to said outer surface to define an insulating space therebetween having a front opening, said method comprising the steps of:

securing a first deflectible sheet to one of said surfaces adjacent said opening, said sheet having a stiffness preselected to cause the sheet to project away from said one surface;

securing a second deflectible sheet to said other surface at said opening;

inserting said liner into said shell to define said insulation space therebetween; and introducing expandable foam insulating material into said insulation space to deflect said sheets toward said front opening and cause the projecting portion of said first sheet to engage the other of said surfaces with said sheet extending between said liner and shell to define an outer boundary of the foamed insulation across said opening, said second sheet being deflected by the upwardly expanding foam insulation to define a portion of the upper boundary of the foamed insulation across said opening.

12. The method of assembling a foamed-in-place, insulated cabinet structure, comprising the steps of:
   forming an outer cabinet member having a peripheral portion;
   forming an inner liner having a peripheral portion;
   securing a first portion of a strip flexible sealing material to said liner about its peripheral portion, the remainder of said strip projecting away from said liner, said material permitting air flow therethrough and preventing foam flow therethrough;
   positioning said liner within said cabinet member in spaced relationship thereto so as to define an insulation space therebetween, said cabinet flange portion and said liner peripheral portion being in spaced adjacent relationship with said strip extending to adjacent said outer cabinet member peripheral portion;
   positioning a breaker strip to extend between said peripheral portions outwardly of said strip; and
   causing expansion of foam insulation in said insulation space such that as said foam expands toward said peripheral cabinet and liner portions to substantially fill said insulation space said remainder of the strip is deflected to a position extending across the insulation space between said flange and said peripheral liner portion thereby sealing said space against the escape of said foam insulation therefrom while permitting air to escape from said space during the expansion of the foam.

13. The cabinet assembly method of claim 12 wherein said breaker strip defines an inturned peripheral flange and said strip is caused to engage said flange by the expanding foam.

14. The cabinet assembly method of claim 13 wherein said outer cabinet member defines an inturned flange outwardly of said breaker strip flange.

15. The method of assembling a foamed-in-place, insulated cabinet structure, comprising the steps of:
   forming an outer cabinet member having an inwardly extending peripheral flange portion;
   forming an inner liner having a peripheral portion;
   securing a first strip of flexible sealing material to one of said cabinet member and liner about its peripheral portion;
   securing a second strip of flexible material to the other of said cabinet member and liner about its peripheral portion;
   positioning said liner within said cabinet member in spaced relationship so as to define an insulation space therebetween, said cabinet flange portion and said liner peripheral portion being in spaced adjacent relationship; and
   causing expansion of foam insulation in said insulation space such that as said foam expands toward said peripheral cabinet and liner portions said first strip is deflected to a position extending across the insulation space between said flange and said peripheral liner portion thereby sealing said space from the escape of said foam insulation, said second strip being deflected by the foam insulation to cooperate with said first named strip to seal said space against the escape of said foam insulation therefrom.

* * * * *